United States Patent
De Filippis et al.

(10) Patent No.: US 6,426,601 B1
(45) Date of Patent: Jul. 30, 2002

(54) POWER SUPPLY SYSTEM OF AN ELECTRONIC SWITCHING ELECTRIC MOTOR FOR AIR-CONDITIONING DEVICES TO BE INSTALLED INSIDE THE MOTOR VEHICLES

(75) Inventors: Pietro De Filippis, Monza; Angelo Del Favero, Crescentino, both of (IT)

(73) Assignee: Biton S.p.A., Turin (IT)

( * ) Notice: Subject to any disclaimer, the term of this patent is extended or adjusted under 35 U.S.C. 154(b) by 0 days.

(21) Appl. No.: 09/581,354

(22) PCT Filed: Dec. 7, 1998

(86) PCT No.: PCT/EP98/07930

§ 371 (c)(1),
(2), (4) Date: Jun. 9, 2000

(87) PCT Pub. No.: WO99/31780

PCT Pub. Date: Jun. 24, 1999

(30) Foreign Application Priority Data

Dec. 15, 1997 (IT) .......................................... TO97A1092

(51) Int. Cl.[7] .................................................. H02P 5/00
(52) U.S. Cl. ...................... 318/139; 318/442; 180/65.2; 180/65.8; 307/80
(58) Field of Search ........................ 318/139, 106–109, 318/442; 180/65.2, 65.3, 65.8; 320/138; 307/48, 80, 84, 87, 130

(56) References Cited

U.S. PATENT DOCUMENTS

| | | | |
|---|---|---|---|
| 3,971,454 A | * | 7/1976 | Waterbury .................. 180/65.8 |
| 5,205,781 A | | 4/1993 | Masayuki et al. |
| 5,414,306 A | * | 5/1995 | Kanno et al. ................ 307/130 |
| 5,950,752 A | * | 9/1999 | Lyons ........................ 180/65.2 |

FOREIGN PATENT DOCUMENTS

| | | |
|---|---|---|
| DE | 44 09 704 A | 9/1995 |
| DE | 195 38 946 C | 4/1997 |
| EP | 0 751 576 A | 1/1997 |

OTHER PUBLICATIONS

ATZ Automobiltechnisch Aeitschrift 94 (1992) Oktober, No. 10., Stuttgart, DE.
English abstract of 57020712, filed Feb. 12, 1985, Japan.

* cited by examiner

*Primary Examiner*—Khanh Dang
(74) *Attorney, Agent, or Firm*—Merchant & Gould P.C.

(57) ABSTRACT

A power supply system of an electronic switching electric motor for air-conditioning devices is described, said power supply system is intended to be installed in the motor vehicles and comprises a solar panel (13), which is an integral part of the vehicle and supplies electric energy to the motor (4, 52). The electric motor (4, 52) can be further powered by the vehicle battery (54), in a way that no specific equipment is needed to convert the energy, nor converting devices are needed between the motor (4, 52) and the solar panel (13). Solar panels (13) can be used with a higher voltage output than that of the vehicle battery, in such a way as to draw the available electric energy at a voltage and current level suitable to achieve a significant decrease of the dissipation of energy in the system, with the same sections of wiring or in accordance with the known techniques of the low voltage solar panels.

12 Claims, 5 Drawing Sheets

POWER SUPPLY SYSTEM OF AN ELECTRONIC SWITCHING ELECTRIC MOTOR FOR AIR-CONDITIONING DEVICES TO BE INSTALLED INSIDE THE MOTOR VEHICLES

TECHNICAL FIELD

The present invention refers to an electronic switching power supply system for air-conditioning devices to be installed inside motor vehicles.

BACKGROUND

The air-cooling of the vehicle passenger compartment, when the vehicle is parked, is greatly limited by the lack of an autonomous source that supplies electric energy when the engine is switched off.

In fact, the amount of electric energy supplied by the storage battery already present in the vehicle is insufficient to guarantee such air-cooling for a prolonged period of time.

On the other hand, it would be extremely useful to implement such a system in the motorcars, in order to obtain undoubted advantages in terms of comfort for the user of the vehicle; furthermore, the existing air-conditioning system in the vehicle could be made even more efficient, with respect to the known art, by minimizing the amount of heat to dispose of at the ignition of the engine.

The installation of a photovoltaic cell on the roof of the vehicle, in the form of a solar panel, partially enables the difficulties mentioned above to be overcome, since the fan of the air-conditioning device is powered by the energy supplied by the solar panels.

However, since, for economic reasons, the same electric motor of the fan is used, and said fan is also powered by the storage battery of the vehicle, it is necessary to interpose at least one energy device adapter between the motor and the solar panel, in such a way as to use the available electric energy efficiently, allowing for the fact that oscillations of available power are produced, caused by the variations of the sun radiation and of the temperature of the panel.

FIG. 1 shows a Cartesian drawing of the V-I characteristics of a solar panel for traditional motorcar use, wherein, on the axis of abscissas, the voltage values (V) are indicated in Volt and, on the axis of ordinates, the current intensity values (I) are indicated in Ampere.

It is evident that such a solar panel is similar to a current generator substantially up to the axis indicated by A, i.e. just next to the knee-point of the curves, which are shown in the Cartesian diagram of FIG. 1.

In said FIG. 1, there is a point in the characteristic curve, indicated by the letter G, equal to a radiation flow of 700 W/m$^2$ and to a temperature of about 25 degrees centigrade, wherein the panel has its maximum energy efficiency.

The locus of the points of maximum energy efficiency, that is given by the product of the output voltage with the output current, when the radiant incident power changes, is, by good approximation, a vertical straight line (isovoltage, indicated by the letter X in FIG. 1), while, by changing the temperature, the locus of the points of maximum energy efficiency is a horizontal straight line (isocurrent).

Further, in the Cartesian diagram of FIG. 1, a point of maximum efficiency at the temperature of 65° C. is indicated with the letter H.

It can be demonstrated that the efficiency decreases by about 0.5% per each Kelvin grade.

Allowing that the direct current electric machines with a commutator are optimised to function to a given supply voltage, when the power supply is an element with an elevated dynamic impedance, such as a current generator, as in the case of a solar panel, the panel-motor system functions in low efficiency conditions, which are worsened in conditions of low sun irradiation.

To overcome this inconvenience, a direct current converter is interposed between the solar panel and the motor, as shown in FIG. 2, wherein a block corresponding to the solar panel is indicated by number 13, a block corresponding to the motor by number 4, and a block corresponding to the direct current converter by number 2.

A power output control device, indicated by the number 3 in FIG. 2, can be interfaced with the wiring of the vehicle, which is indicated generally by 6.

Such embodiments were necessary, to improve the energy match, however, this type of solution is expensive in economic terms and in terms of overall size and weight.

Furthermore, it is necessary to consider, in the global energy balance, the conversion losses inevitably introduced by the direct current converter 2.

Finally, to work the system at the maximum efficiency point, it is necessary to provide a temperature sensor on panel 13, which inevitably, increases the production costs.

In conclusion, if the converter 2 is fitted in the proximity of the solar panel 13, as is usually done in motorcars, an elevated value of current intensity passes through the wiring resistance 5, thereby lowering the system efficiency.

SUMMARY

A purpose of the present invention is to overcome the above mentioned inconveniences, and to provide a power supply system of an electronic switching electric motor for air-conditioning devices to be installed inside the vehicles. In order to have the maximum use of the available energy at the output terminals of the solar panel to power the motor, the system may be configured without interposing any electronic conversion or electronic control device between the two objects.

Another purpose of this invention is to realise a power supply system of an electronic switching electric motor, without using expensive components or complex technologies.

Such objectives are achieved by a power supply system of an electronic switching electric motor for air-conditioning devices to be installed inside the motor vehicles made in accordance with the present invention as disclosed herein.

Using the operating characteristics of an electronic switching motor with a double machine, that uses, in its electronic control unit, a microprocessor and a very low friction method of rotor suspension, it is possible to obtain the power supply system as claimed in claim 1, using the aforesaid electronic switching motor in two different operating modes, one relative to the system powered by the storage battery and by the traditional electric system found in motor vehicles, the other relative to a power generated by a solar panel.

The switching between the two operating modes is automatic and it does not require any additional components nor signals from an external source, as it uses an electromagnetic relay that is already present in the traditional type of an electronic switching motor.

DESCRIPTION OF THE DRAWINGS

The characteristics and the advantages of the present invention will be made clear in the following description, using non-limiting examples, and by referring to the attached figures, in which.

DETAILED DESCRIPTION

Figure 1:
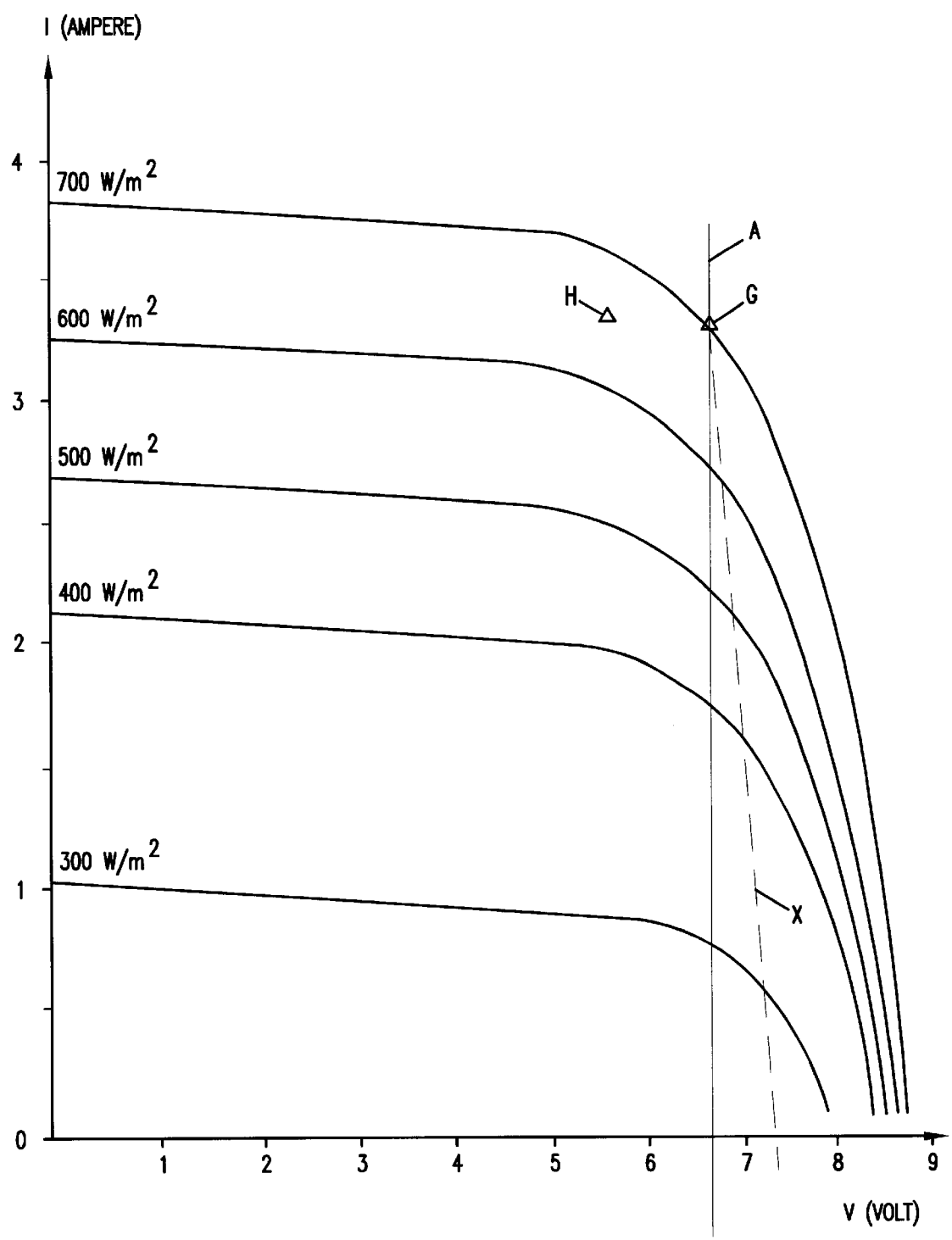
FIG. 1 shows a Cartesian diagram that illustrates the voltage-current characteristics of a solar panel for motorcars of a known type.
Figure 2:
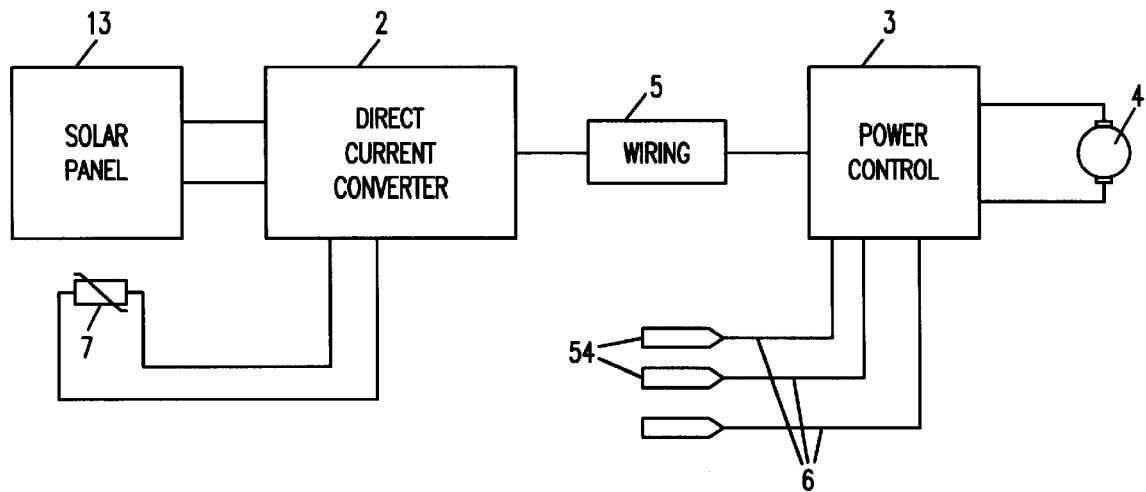
FIG. 2 illustrates a block diagram of a power supply system for electric brush motors and commutator with adapter converter for traditional type air-conditioning devices.
Figure 3:
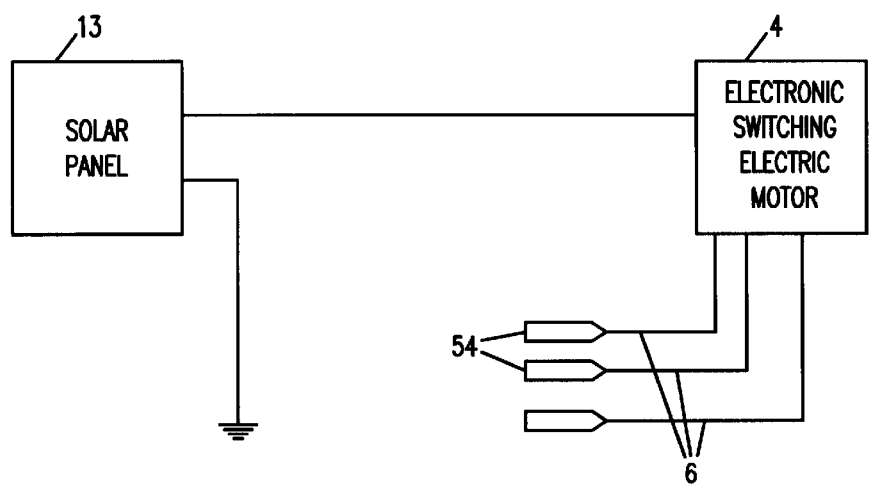
FIG. 3 shows a general block diagram of an electronic switching electric motor power supply system to be installed inside motor vehicle air-conditioning devices, in accordance with the present invention.

Referring to the figures mentioned above, a solar panel to be installed inside the power supply system. is indicated schematically by number 13. In accordance with the present invention, a direct current converter, of the "DC-DC" type used to improve power matching, is indicated by number 2, a power control electric device is indicated by number 3, an electronic switching electric motor is indicated by number 4, the power wiring of the motor vehicle is indicated by number 5, the control wiring is indicated by number 6, and a temperature sensor to be applied to the solar panel 13 is indicated by number 7.

Figure 4:
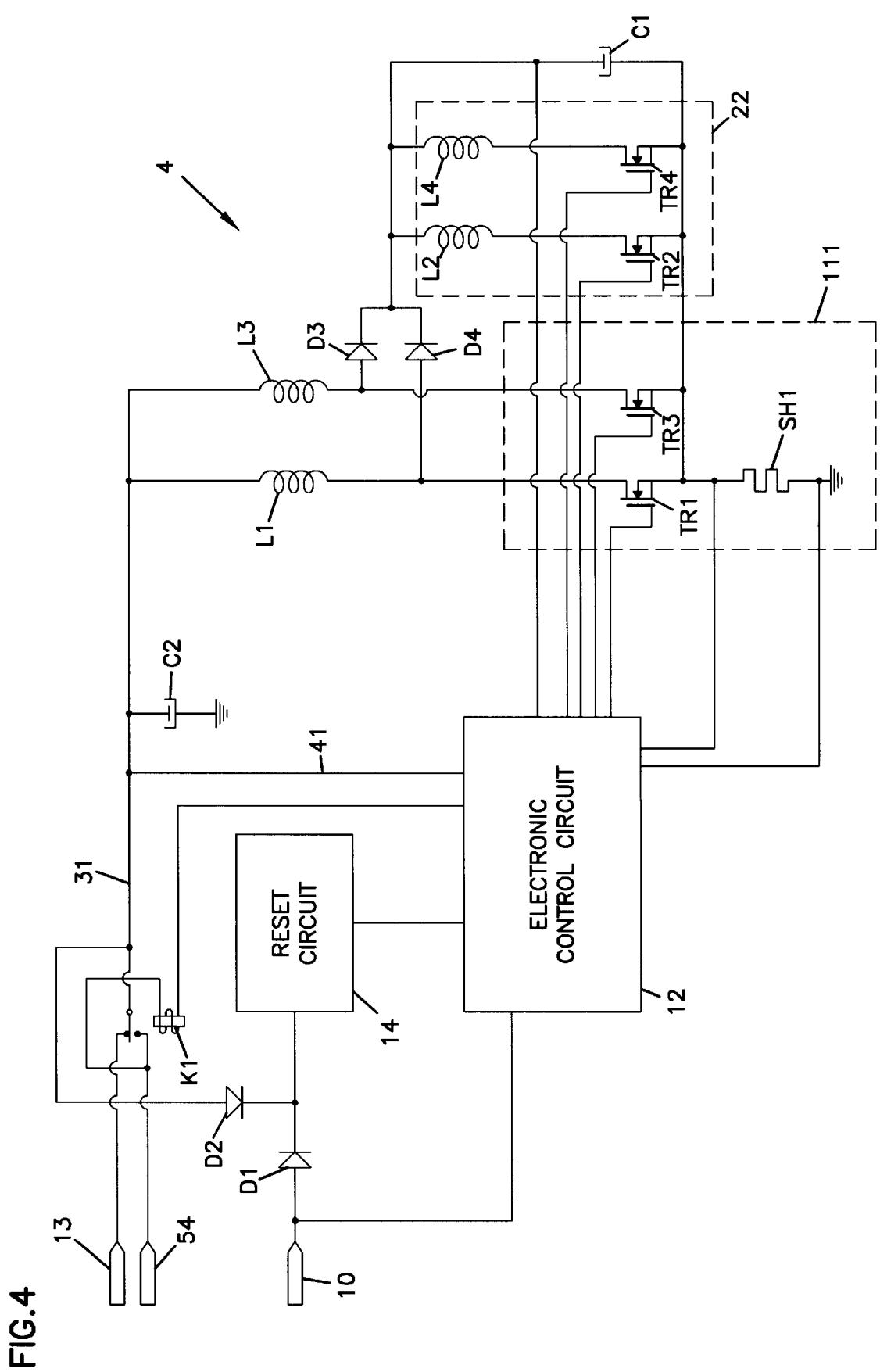
FIG. 4 represents a general block diagram of an electronic switching motor powered by a power supply system, in accordance with the present invention.

With particular reference to FIG. 4, which shows the basic diagram of an electronic switching electric motor 4 with a double machine, the working scheme of the power supply system, in accordance with this invention, is as follows.

At the opening of the electric contact which can be activated by the ignition lock key or by sending a correct equivalent signal 10, the relay K1, contained in the motor 4, is released by the electronic control unit 12 and the powering of the motor 4, through a quiescent contact of the relay K1, is secured by a solar panel, indicated by 13, on the electrical conductor 3.

The relay K1 comprises, preferably, an electromechanical or electronic changeover switch, with a quiescent contact wired to the solar panel 13 and an excitation contact wired to the battery 54 of the vehicle electric system in such a way that, without other control, the motor 4 automatically presets to an operating mode using the solar panel 13 power, without needing to use signals or power exchanges within the rest of the motor vehicle electric system.

The changeover relay k1, integrated in the structure of the electric motor 4 and not purposely added to achieve the purposes of the present invention, is further used to protect the solar panel 13 from the application of the inverse voltage of battery 54, when battery 54 powers the above mentioned electric motor 4.

In the case where the irradiation conditions are suitable, a microprocessor of the control unit 12 recognises the serviceability of the solar panel 13, on the basis of the voltage value present on conductor 41, when relay k1 is released.

Otherwise, if the abovesaid voltage value is not sufficient, the reset circuit 14 of the microprocessor maintains the circuit in a rest condition until the supply voltage has reached a value for the system to function appropriately.

The circuit 14 also provides power to the electronic

The voltage available at the terminals of the solar panel 13 is applied, through the coils L1 and L3 of the motor 4, on the capacitor C1, necessary for the motor 4 to work, thereby providing power to the high voltage machine 22. The machine 22, since it is positioned downstream a "step-up" converter, has a current generator as its power supply. The generator is represented, in a normal mode, by the coils L2 and L3 in switching mode and by the diodes D3 and D4 and, in the case where the microprocessor of the control unit 12 detects the presence of the solar panel 13, by the solar panel itself.

It should also be noted that the diodes D3 and D4 are structural components of the electric motor 4 power supply system and that they are not elements added on purpose to achieve the purposes of the present invention; however, they can be used, in this case, to protect the solar panel 13 from the inverse voltage phenomenon induced by the rotation of motor 4 caused by aerodynamic or inertial effects when the solar panel 13 works as the electric power supplier in conditions of low illumination.

The working control of the machine 22 takes place through the microprocessor that drives, in pulse-width modulation ("PWM"), the "mosfet" transistors TR2 and TR4 and stabilises the voltage on the capacitor Cl to an optimal efficiency value for the solar panel 13 being used.

The voltage stabilisation is achieved by modifying the "duty cycle" value of the signal modulated in "PWM" mode.

In this situation, the electric motor 4 works under iso-voltage conditions, i.e. the voltage-current characteristic of the solar panel 13 moves along the locus of the maximum efficiency points, as the sun irradiation intensity changes.

The low static torque characteristic of this type of motor 4 enables the motor to start even with very low levels of sun irradiation.

In any case, if motor 4 does not start, because it is naturally positioned on a zero torque point, the microprocessor can control an operation of rotor positioning, by operating the "mosfet" transistors TR1 and TR3 of the machine 111.

To allow for variations in efficiency of the solar panel 13 due So temperatures, creating very long time constants, an application program contained in the microprocessor of control unit 12 controls periodically small variations of the "duty-cycle" around the working points, verifying how these variations have an effect on the rotational speed of the motor 4.

In fact, the measurement of the rotational speed is a function normally carried out by the microprocessor for the control of the correct operation of motor 4 and, if an increase of the rotational condition is verified, the application program will consider this new point as a proper working point; in the opposite case, it will maintain unchanged the previous working point.

The application program of the control microprocessor is designed, in fact, if such a way as to enable operation with just the high voltage machine 22. The components of said machine comprise the "mosfet" transistors TR2 and TR4 and the inductors L2 and L4, and said machine optimises the power matching with solar panel 13.

In this way, it is possible to cover the entire characteristic of the solar panel 13, using its full capacity, thanks to the modification to the working point under isocurrent conditions.

It should be noted that, when the microprocessor recognizes the presence of the solar panel 13, no signals are exchanged with the traditional electric system of the vehicle, thus guarantying the operating functions of the electric motor 4 and null or negligible current drain by the power supply 54 of the motor vehicle, which usually comprises a storage battery.

Further, it should be noted that the automatic switching in the presence of the solar panel 13 requires the motor 4 to support a lifetime corn parable to that of a motor vehicle, equal to about 30,000 working hours.

An embodiment of the brushless electric motor 4, 52 with a high reliability rotor support is the best technical and economical solution that achieves the predefined lifetime goal.

It is possible, if the available voltage at the solar panel 13 terminals is low, to interpose a power supply 51 of the "step-up" type between the solar panel itself 13 or the storage battery 54 and a commutator motor 52 designed to function at high voltage, for example 60 Volts, and with a further electronic control unit 53, suitable to adjust the functions thereof.

Figure 5:
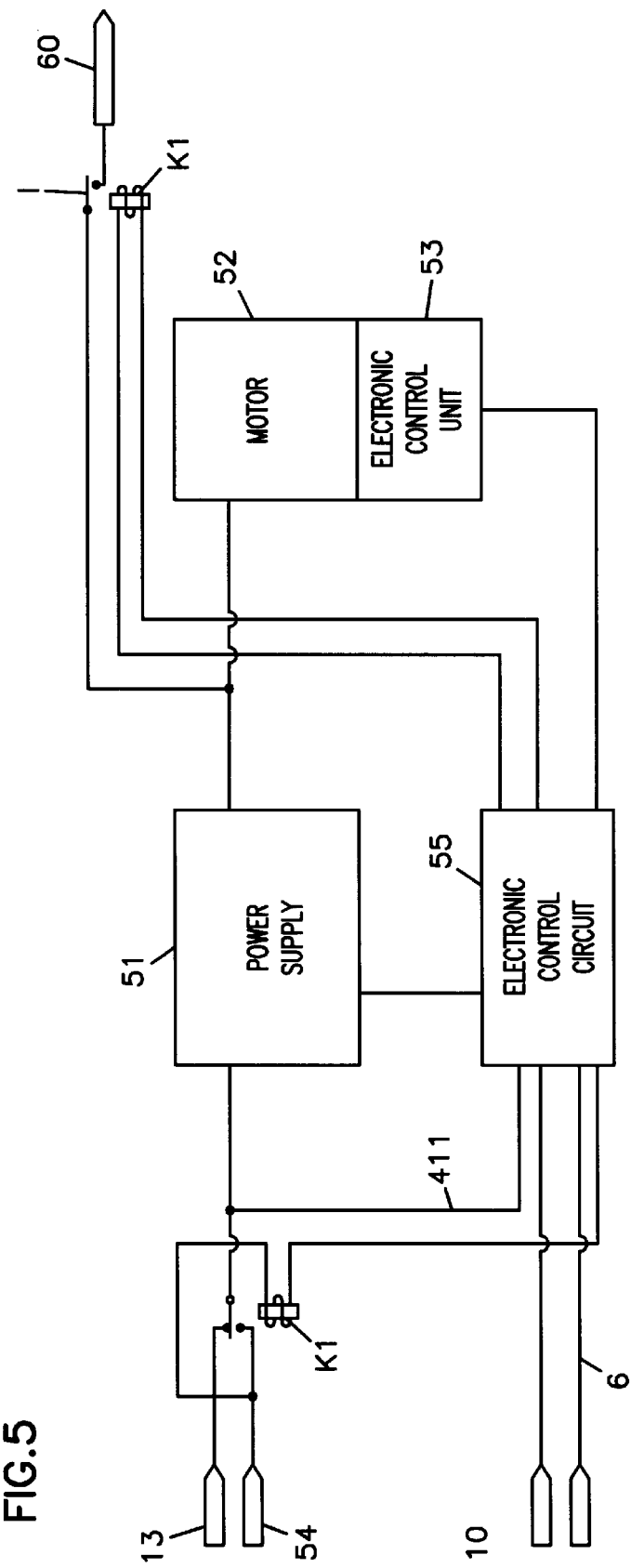
FIG. 5 shows a block diagram of an alternative embodiment of an electronic switching electric motor power supply, to be installed in motor vehicle air-conditioning devices, in accordance with the present invention.

FIG. 5 shows the application block diagram of such a system, wherein the relay K1 is emphasized. The relay can switch between two different operating modes corresponding to the normal operating mode and to the operating mode with solar panel 13.

A further electronic control circuit 55 is driven by the motor vehicle and properly adjusts the power supply "step-up" 51 that works as a voltage booster, to match the storage battery voltage 54. The circuit 55 is connected to the conductor 411, with the rated operating voltage of the motor at a high voltage 52.

In the case where it is desirable to direct the solar panel 13 energy towards a load element 60 rather than the motor 52, the electronic control unit 53 of the motor 52 disconnects the motor, by operating the switch I, which can be an electromagnetic relay or an electronic switch. Through the electronic circuit control 55, it is possible to produce energy from the solar panel 13 at the desired voltage value, to an external load 60, that is, for example, the storage battery 54 of the vehicle, which, in this case, would be kept charged even when the motor vehicle engine is shut off.

Further, the same result can be achieved using the existing circuitry inside a "brushless" type motor, just by adding switch I.

Figure 6:
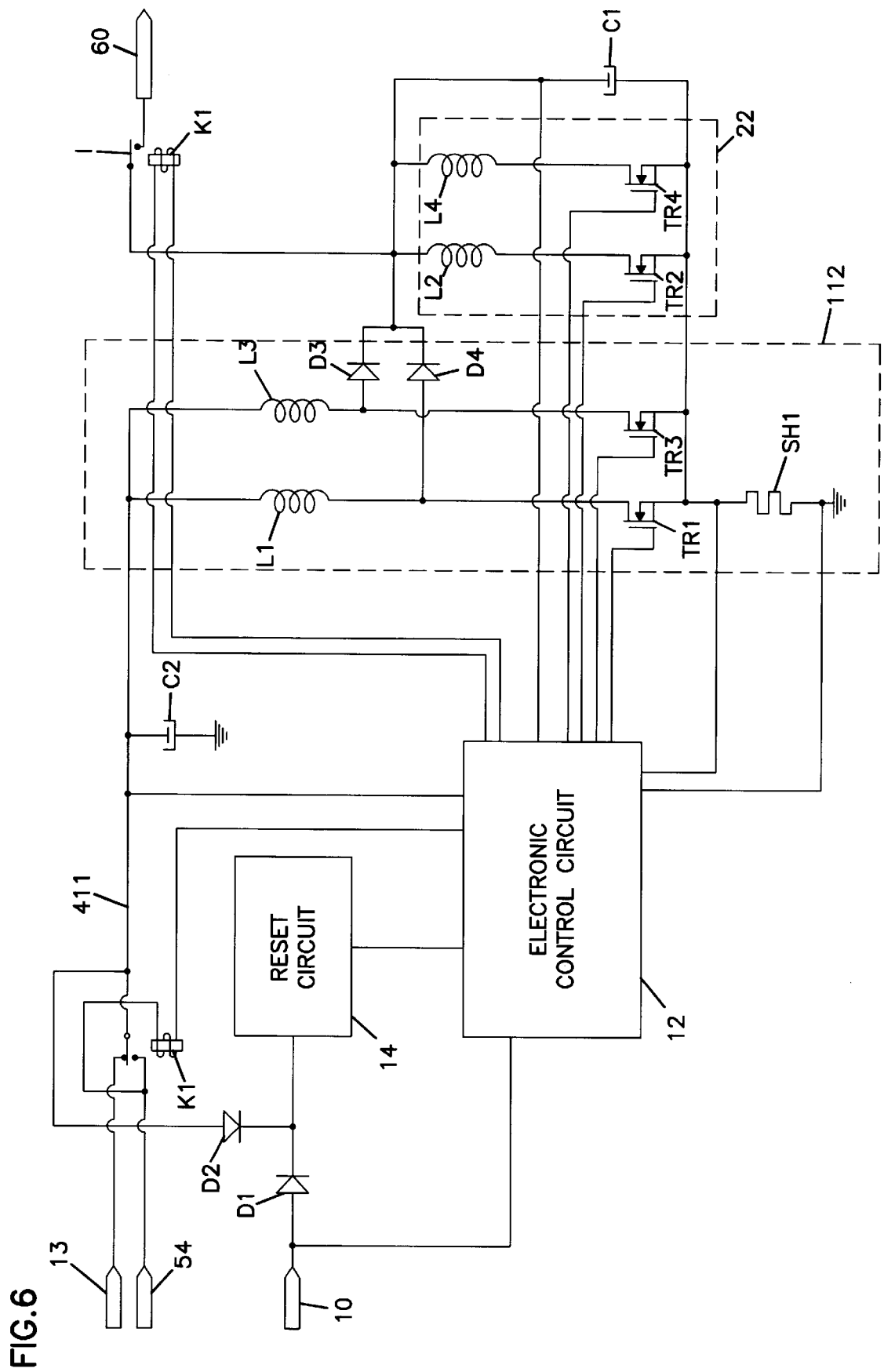
FIG. 6 shows a schematic electronic circuit of a further embodiment of the electronic switching electric motor power supply, in accordance with the present invention.

A circuit application is shown in FIG. 6, wherein it is emphasised that the machine 22 is switched off and is not used. The two mosfet transistors TRI and TR3 are driven in parallel, through a pulse-width modulation control ("PWM"), operated by means of already existing electronic components on motor 52 (L1, L3, D3, D4, C1, C2, microprocessor of the control unit 12) as a step-up power supply that powers an external load 60, through an electromechanical or electronic switch I properly controlled by the control logic unit of the control unit 12.

The load 60, also shown in his embodiment, could be the motor vehicle storage battery 54.

The microprocessor of the control unit 12 optimises the energy conversion by measuring the voltage at the capacitor terminals C2, thereby making the solar panel 13 work at a point of maximum efficiency.

It is important to underline that the capacitors C1 and C2 and the resultant inductance of machine 112 are structural components of a power supply system of an electronic switching electric motor and that they are not elements added especially for to this invention.

Furthermore, they can be used as an electromagnetic filter "EMI" for the protection of the motor vehicle electric system from problems caused by the "brushless" type working motor 52. Note again that, if it is necessary to supply stabilised power to other loads 60, which have an operating voltage lower than the solar panel output voltage, this, again, can be carried through relay I and the machine 22 will provide stabilisation while operating as a "shunt" parallel linear regulator.

From the above description, the characteristics, as well as the advantages, of a power supply system of an electronic switching electric motor to be installed in motor vehicle air-conditioning devices are clear.

In particular they are represented by:
possibility to power a ventilator fan of a motor vehicle air-conditioning unit by the motor vehicle battery or by a solar panel, as an integral part of the vehicle, without the need to interpose any external element to the motor for the conversion of energy or for the electric matching between the motor and the solar panel;
possibility to use solar panels at a high voltage, collecting available electric energy at a high voltage and at a low current to allow, with equal sections of wiring, the minimum energy dissipation therein;
possibility to protect the motor vehicle electric system from problems caused by the working motor;
possibility to protect the solar panel from application of battery inverse voltage during the operation of the system;
possibility to protect the solar panel from inverse voltage caused by the motor rotation because of aerodynamic or inertial effects, when the system works with the solar panel at low illumination conditions;
automatic search of the maximum efficiency point of the solar panels, when the irradiation conditions and the temperature conditions change, without using sensors or customised electric connections;
simple structure similar to a traditional motor electrical circuit diagrarm not powered by solar panels;
the system works as a power supply "step-up", carrying solar panel energy on an external load comprising, for instance, the storage battery of the vehicle, maximising the energy conversion efficiency through a customised mathematical algorithm controlled by a microprocessor of a control unit;
possibility to supply a voltage stabilised at a low absolute value to an external load, when the system works with solar panels.

It is clear that several other changes, besides those mentioned above, can be made to the power supply system of the electronic switching electric motor in accordance with the present invention without departing from the principles of the inventive idea. In addition, different components and materials may be used according to the specific technical requirements.

What is claimed is:

1. A power supply system of an electronically commutated DC permanent magnets electric motor (4, 52) suitable for installation inside air-conditioning devices for motor vehicles, the power supply system including at least one solar panel (13) electrically wired to said electric motor (4, 52) and in turn to a plurality of series cells wired in such a way to collect available electrical energy at a substantially high voltage value and at a low current intensity value to allow a lower energy dissipation inside the power supply system, the electric motor (4, 52) comprising: a switch device (K1) that switches between at least two different positions corresponding to two operating modes of the power system by means of a control provided by at least one control unit (12) to connect alternatively the electric motor with an energy storage battery (54) or with the solar panel (13); a first capacitor (C2) connected between the switch device (K1) and ground; a first coil (L1) connected on one end to the switch device (K1) and on the other end to a first transistor (TR1) which is connected to ground via a shunt (SH1); a second coil (L3) connected on one end to the switch device (K1) and on the other end to a second transistor (TR3) which is connected to ground via said shunt (SH1); a first diode (D4) whose anode is connected between the first coil (L1) and the first transistor (TR1); a second diode (D3) whose anode is connected between the second coil (L3) and the second transistor (TR3) and whose cathode is connected to the cathode of said first diode (D4); a second capacitor (C1) connected between the cathodes of said first and second diodes (D4, D3) and the ground via the shunt (SH1); a third coil (L2) and a third transistor (TR2) connected in series across the capacitor (C1); a fourth coil (L4) and a fourth transistor (TR4) connected in series across the second capacitor (C1); said first and second coils (L1, L3), said first and second transistors (TR1, TR3), said first and second diodes (D4, D3) and said second capacitor (C1) forming a power source in the form of a step-up converter; and said third and fourth coils (L2, L4) and said third and fourth transistors (TR2, TR4) forming a first part (22) of a high voltage electronic circuit powered by said power source; the electric motor (4, 52) being powered, alternatively, through an existing traditional vehicle electric system or through the solar panel (13), and the switching between said power sources being automatically managed by the control unit (12) by commanding the switching element (K1) without any additional components interposed between any of said power sources and said motor in order to match different energetic characteristics of any power source to the motor; the first part (22) of the high voltage electronic circuit having, as its power source in a first system working mode a current generator which comprises said storage battery (54), a plurality of coils (L1, L3) in switching mode, and a plurality of diodes (D3, D4), and in a second system working mode said solar panel connected through at least one coil (L1, L3) and at least one capacitor (C1), in such a way to power the first part (22).

2. The power supply system as claimed in claim 1, wherein said electronic control unit (12) comprises at least one microprocessor which controls the operations of said first part (22) of the electronic circuit by driving with pulse-width modulation (PWM) said transistors (TR3, TR4), thus stabilising voltage in said second capacitor (C1) to a maximum efficiency value for the solar panel (13).

3. The power supply system as claimed in claim 2, wherein said microprocessor uses an application program which periodically executes small changes of a "duty cycle" around a working point (G, H) of said solar panel (13) and verifies how such changes impact a rotation speed of said motor (4), in order to take into account efficiency changes of said solar panel (13) due to temperature and or conditions of irradiation changes.

4. The power supply system as claimed in claim 3, wherein said switch K1) is used to protect said solar panel (13) from inverse voltage of said battery (54) when the system works in one of said two working modes.

5. The power supply system as claimed in claim 3, wherein said diodes (D3, D4) are used to protect the solar panel (13) from inverse voltage caused by said motor (4) rotation because of aerodynamic or inertial effects when the system works in one of said two working.

6. The power supply system as claimed in claim 5, wherein said microprocessor controls a rotational positioning operation by activating a plurality of transistors (TR1, TR3) of a second part (111, 112) of the electronic circuit of said power supply system if said motor (4) does not move because it is positioned on a working point which has a static torque equal to zero.

7. The power supply system as claimed in claim 6, wherein said first part (22) of the electronic circuit is disabled while said transistors of said second part (111, 112) of the electronic circuit are driven in parallel through a pulse-width modulation control (PWM) by said electronic control unit (12).

8. The power supply system as claimed in claim 7, wherein said electronic control unit (12) and said power supply source (14), together with the first and second coils, the first and second diodes, and the first and second capacitors in said motor (4, 52) work as a "step-up" power supply system capable to power at least one external load (60), through an electromechanical or electronic switch device (1), controlled by said microprocessor of the electronic control unit (12).

9. The power supply system as claimed in claim 8, wherein said external load (60) comprises said motor vehicle storage battery (54).

10. The power supply system as claimed in claim 8, wherein said microprocesser optimises energy conversion by measuring a voltage value at terminals of at least one capacitor (C2) in the electronic circuit, putting said solar panel (13) to work at a maximum efficiency.

11. The power supply system as claimed in claim 8, wherein said motor (4, 52) supplies stabilies voltage to other external loads (60) by working as a parallel "shunt" linear regulator, said stabilised voltage being drained from at least one capacitor (Cl) of the electronic power supply circuit of said motor (4, 52).

12. The power supply system as claimed in claim 6, wherein said second part (111, 112) of the electrontic circuit comprises a plurality of electronic components (C1, C2, L1, L3) used for protection of the motor vehicle electric system from problems caused by operation of the electric motor.

* * * * *